United States Patent [19]

Kim

[11] Patent Number: 4,885,869
[45] Date of Patent: Dec. 12, 1989

[54] AUTOMATIC WATER-SUPPLYING FLOWERPOT UTILIZING THE CAPILLARY ACTION AND ITS WATER-SUPPLYING CONTROL METHOD

[76] Inventor: Young K. Kim, 220-2, Suyu-dong, Dobong-gu, Seoul, Rep. of Korea

[21] Appl. No.: 256,571

[22] Filed: Oct. 12, 1988

[30] Foreign Application Priority Data

Oct. 21, 1987 [KR] Rep. of Korea .......... 17926/1987[U]

[51] Int. Cl.$^4$ .............................................. A01G 9/02
[52] U.S. Cl. .......................................... 47/66; 47/79; 47/81; 47/80
[58] Field of Search .......................... 47/79, 80, 81, 82

[56] References Cited

U.S. PATENT DOCUMENTS

| | | | |
|---|---|---|---|
| 165,000 | 6/1875 | Johnson | 47/81 |
| 681,672 | 9/1901 | Andrews | 47/80 |
| 1,216,642 | 2/1917 | White | 47/80 |
| 1,450,633 | 4/1923 | Hudson | 47/81 |
| 2,638,716 | 5/1953 | Luipersbek | 47/79 |
| 4,052,818 | 10/1977 | Hagerty | 47/81 |
| 4,219,967 | 9/1980 | Hickerson | 47/81 |

Primary Examiner—Robert A. Hafer
Assistant Examiner—Charles H. Sam
Attorney, Agent, or Firm—Beveridge, DeGrandi & Weilacher

[57] ABSTRACT

An automatic water-supplying flowerpot and its water supply control method are disclosed, in which the principle of capillary action is utilized. The flowerpot of the present invention comprises an upper pot for containing the soil to raise a plant, a lower pot for storing the water, and an intermediate portion for integrally connecting the said upper and lower pots. A water supply control tube which is stuffed with an absorption material extends from the bottom of the lower pot to the bottom of the upper pot in order to adequately supply the water into the soil of the upper pot, the water supply control tube including a large bore and a plurality of small bores. The advantage of the device of the present invention is that frequent waterings are not required, but the watering may be done once for every couple of months, thereby making it possible to leave the flowerpot uncared during a long trip and the like.

2 Claims, 2 Drawing Sheets

AUTOMATIC WATER-SUPPLYING FLOWERPOT UTILIZING THE CAPILLARY ACTION AND ITS WATER-SUPPLYING CONTROL METHOD

FIELD OF THE INVENTION

The present invention relates to an automatic water-supplying flower pot utilizing the capillary action, and to its water-supplying control method, the flowerpot comprising an upper pot containing the soil and plant, a lower pot containing the water, and an intermediate portion connecting unitizingly the upper and lower pots, and the said intermediate portion being designed to receive a water supply-controlling tube which includes a large bore and small bores of proper size, so that the water supply from the lower pot to the upper pot could be properly controlled depending on the nature of the plants to be raised in the pot.

BACKGROUND OF THE INVENTION

In the conventional flowerpots, water is put over the surface of the soil directly, and therefore, the water remains in the pot for a short period of time. If there is an excess water put into the pot, it is drained away through the drain hole in the bottom of the flower pot. Accordingly regardless of whether a large amount or small amount of water is put into the flower pot, the water can remain in the pot for only a short period of time, and therefore, there arises the troublesome problem of putting the water into the pot every day or every several days. Not only so, but if the caring person is absent because of a trip or other reasons, the plant in the pot can die due to the water deficiency. Further, in the summer season, the surface soil appears dry in spite of the fact that the water is profusely contained within the soil. In such a case, if the water is put too frequently, the roots of the plant can be caused to become rotten due to the excess water.

SUMMARY OF THE INVENTION

In order to obtain a solution for the disadvantages of the conventional flowerpot as described above, the present inventor carried out a number of experiments and studies to find out the characteristics of the capillary action, the findings being disclosed in Experiment 1 as set forth below.

Experiment 1

Two transparent acryl test tubes A,B having respectively the height of 50 cm were provided, with the opposite tips thereof being open, and with the inside diameter of the test tube A being 1 cm throughout the total length. The inside diameter of the test tube B was 5 cm up to the height of 10 cm, and was 1 cm from that point to the height of 40 cm. These two tubes were made uprightly stood within a supporting container having a bottom diameter of 30 cm, and the test tubes were filled with fine dry sand to the full, water being filled in the supporting container up to the height of 5 cm. This was left a couple of days, and it could be observed that the sand locating above the water level could be discriminated into a dry upper layer and a wet lower layer, in such a manner that the wet sand layer of the test tube B having the larger lower inside diameter had a larger height than that of the test tube A having the uniform inside diameter.

The resultant phenomenon described in Experiment 1 above is due to the fact that the capillary effect is stronger in a test tube in which the diameter of the lower section of the test tube is increased compared with the upper section of the test tube.

To examine into the cause of such a phenomenon, the test tube serves as cover for the sand in which the capillary action occurs, and the test tube blocks the evaporation of water from within the sand, thereby increasing the capillary effect. And if the lower section of the test tube is increased in its diameter, and if a part of the lower section is dipped into water, the cross sectional area of the test tube receiving the water becomes larger, and the evaporation effect of water within the test tube is also increased in order to increase the moisture level within the upper narrow section of the test tube, thereby enhencing the capillary action within the whole test tube.

Based on the principle described above, the present invention provides an arrangement such that a cylindrical water supply control tube having a large bore through the lower portion thereof and having a number of small bores at the upper position thereof is mounted upon an intermediate portion, thereby forming an automatic water supply flowerpot based on the principle of capillary action. Here by opening/closing some of the small bores, or by using the water supply control tubes of different diameters, the water supply to the plant can be arbitarily adjusted in accordance with the nature of the plant to be raised. It is the object of the present invention to provide an automatic water supply flowerpot as described above.

BRIEF DESCRIPTION OF THE DRAWINGS

The above object and other advantages of the present invention will become more apparent by describing the preferred embodiment of the present invention in more detail with reference to the attached drawings in which.

DESCRIPTION OF THE PREFERRED EMBODIMENT

Figure 1:
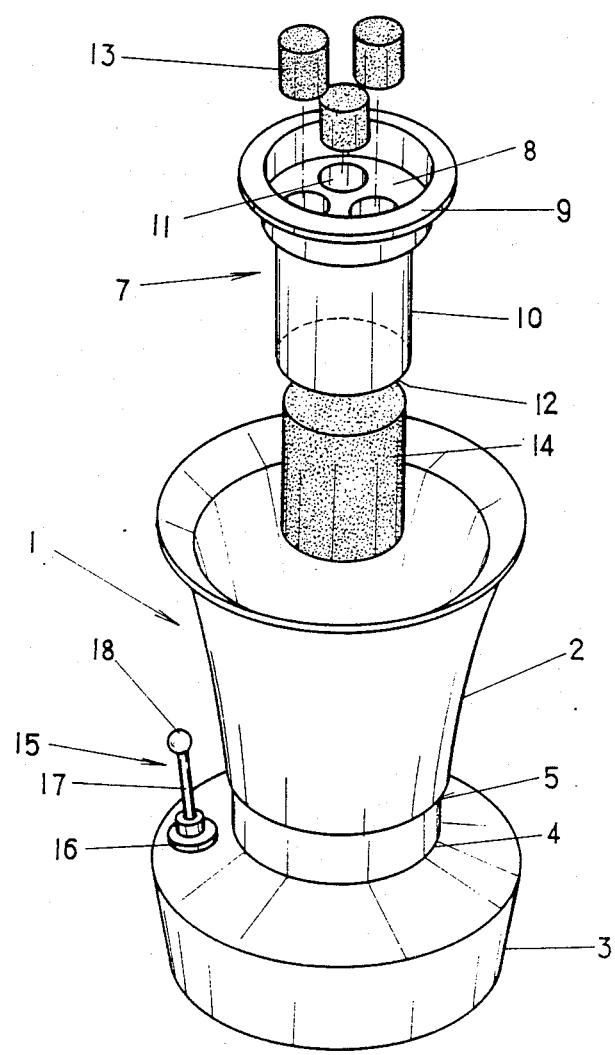
FIG. 1 is an exploded perspective view of the device according to the present invention.
Figure 2:
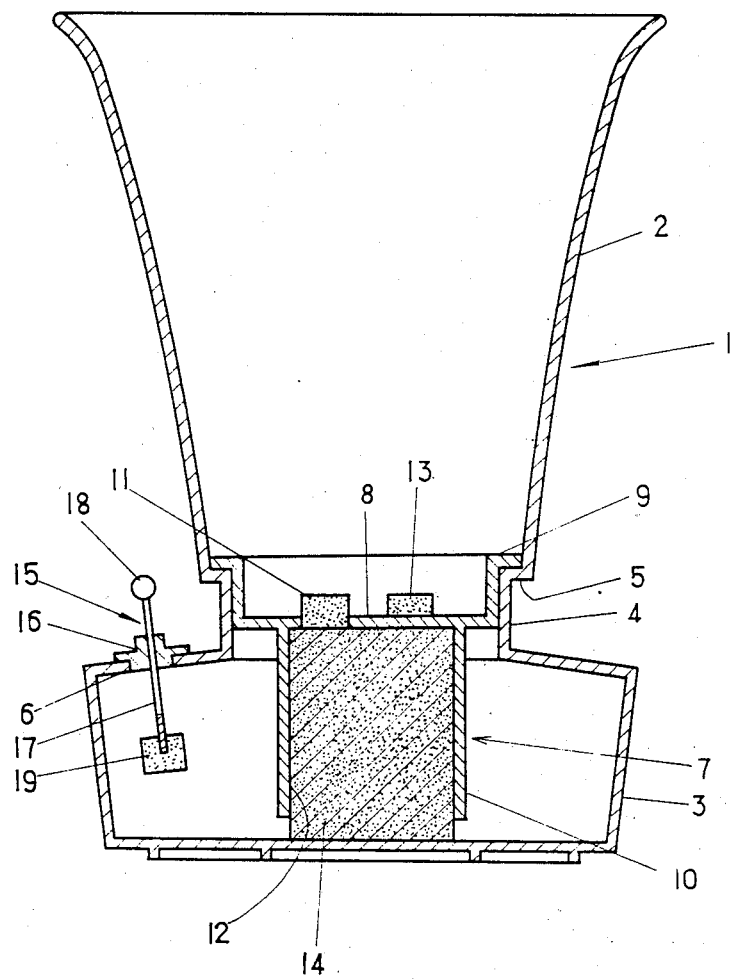
FIG. 2 is a longitudinal sectional view of the assembled device of the present invention.

Reference No. 1 indicates the flowerpot according to the present invention, and the flowerpot 1 comprises an upper pot 2 containing the soil for raising plants, a lower pot 3 for storing water, and an intermediate portion 4 for connecting the upper and lower pots into one unitized body. The lower pot 3 is provided with a filling hole 6 for filling water, and a boundary surface 8 which is installed between the upper pot 2 and the lower pot 3 is provided with a plurality of small bores 11, into which minor absorption members 13 are inserted. A flange 9 is formed along the circumferential edge of the boundary surface 8, so that the flange 9 could be mounted on an annular step 5 of the intermediate portion 4. A water supply control tube 7 having an absorption tube portion 10 with a large bore 12 in which a major absorption member 14 is to be inserted is hung on the annular step 5, in such a manner that the upper pot 2 and the lower pot 3 could be separated each other. A rod 17 is inserted downwardly into the central hole of a cylindrical closure 16 which covers the filling hole 6 of the lower pot 3, and which is removably inserted into the lower pot 3. An indicating sphere 18 and a floater 19 are respectively attached at the upper and lower ends of the rods 17, the whole of these structures constituting a closure gage 15 which shows the water level inside the lower pot 3, and which is detachable from the lower pot 3.

Now the controlling method of the water supply to the upper pot will be described. First the major absorption member 14 is filled into the absorption tube portion 10, and the number of small bores 11 to be used is chosen, the water-supplying function of the small bores having been already adjusted. Into the selected number of the small bores 11, capillary-active minor absorption members 13 are insterted, the number of the selected small bores or the minor absorption members being determined by taking into account the plant's water consumption demand. Meanwhile the small bores which are not filled with the minor absorption members 13 are stuffed with a non-capillary-active material.

The minor absorption members 13 which are inserted into the small bores are made to project upwardly to penetrate into the soil of the upper pot 2, so that the water from the lower storage pot 3 could be delivered into the soil of the upper pot 2, and ultimately to the plant to be raised. Meanwhile if it is desired to keep the water content of the soil at a low level, the small bores 11 can be stuffed with soil instead of being filled with the minor absorption members 13.

There are also alternative ways for controlling the water supply, that is, the water supply can be alternatively controlled by varying the size of the small bores or by varying the inside diameter of the whole water supply control tube.

Thus proper amounts of water can be supplied from the lower pot through the soil to the plant, and further, regardless of whether the water is filled to the full in the lower pot 3 or near empty, or in other words, regardless of whether the water level in the lower pot 3 is high or low, the water is supplied to the plant at the predetermined rate.

Therefore the device of the present invention does not require frequent watering such as every day or every couple of days as in the case of conventional flowerpots, but water filling for the flowerpot of the present invention can be carried out at any convenient time just once for every couple of months. Therefore the flowerpot of the present invention removes the troublesomeness of frequent watering, and can be conveniently left uncared during a lengthy absence such as a long trip and the like. In spite of such uncaring, the water can be always adequately supplied, and the plant can grow in healthy conditions.

If a fertilizer is added into the water in the lower pot, the fertilizer can be supplied to the plant through a long period without loss. Further the flowerpot of the present invention does not require a supporting dish as in the case of the conventional flowerpots, and therefore, water and dust can not be accumulated under the flowerpot, thereby making it possible to keep the occupied ground and the surrounding area clean. Further the device of the present invention removes the disadvantages of the conventional flowerpot that nutritions for the plant such as yeast and the like are washed down to outside by the down-flowing water through the drain hole, because the flowerpot of the present invention supplies the water in the upward direction. Further, although the flowerpot of the present invention comprises an upper pot, a lower pot, and an imtermediate portion with an annular step, still the manufacturing process for it is very simple, and therefore, it has an advantage in terms of the manufacturing costs, because it can be produced in a single step of process.

What is claimed is:

1. A flower pot utilizing capillary action for supplying water to a plant, comprising,
    an upper pot for containing soil for raising a plant, a lower pot for storing water, and an intermediate portion for integrally connecting the said upper pot and the lower pot, said lower pot having a filling hole and an indicating float,
    a water supply control tube having an upper end provided with a flange, said upper pot having an annular step for receiving said flange and for suspending the water supply control tube, said water supply control tube having a large downwardly facing bore for receiving a major absorption member, said water supply control tube having a top plate forming a boundary between the upper pot and the lower pot, said top plate having a plurality of small bores formed therein; and
    a plurality of minor absorption members insertable into the said small bores, said minor absorption members being insertable in and removable from said small bores to change the number of said minor absorption members in order to adjust the delivery of water into the upper pot from the lower pot depending on the water requirement of the plant involved.

2. A water supply control method for flowerpot, wherein the controlling is achieved through the variation of the inside diameters of the water supply control tube or of the small bores, or through the variation of the number of the small bores defined in claim 1.

* * * * *